April 2, 1935.  J. R. HAINES  1,996,416
SWITCH MECHANISM FOR FORWARD AND REAR MOTOR VEHICLE SIGNALS
Filed Jan. 8, 1932  3 Sheets-Sheet 1
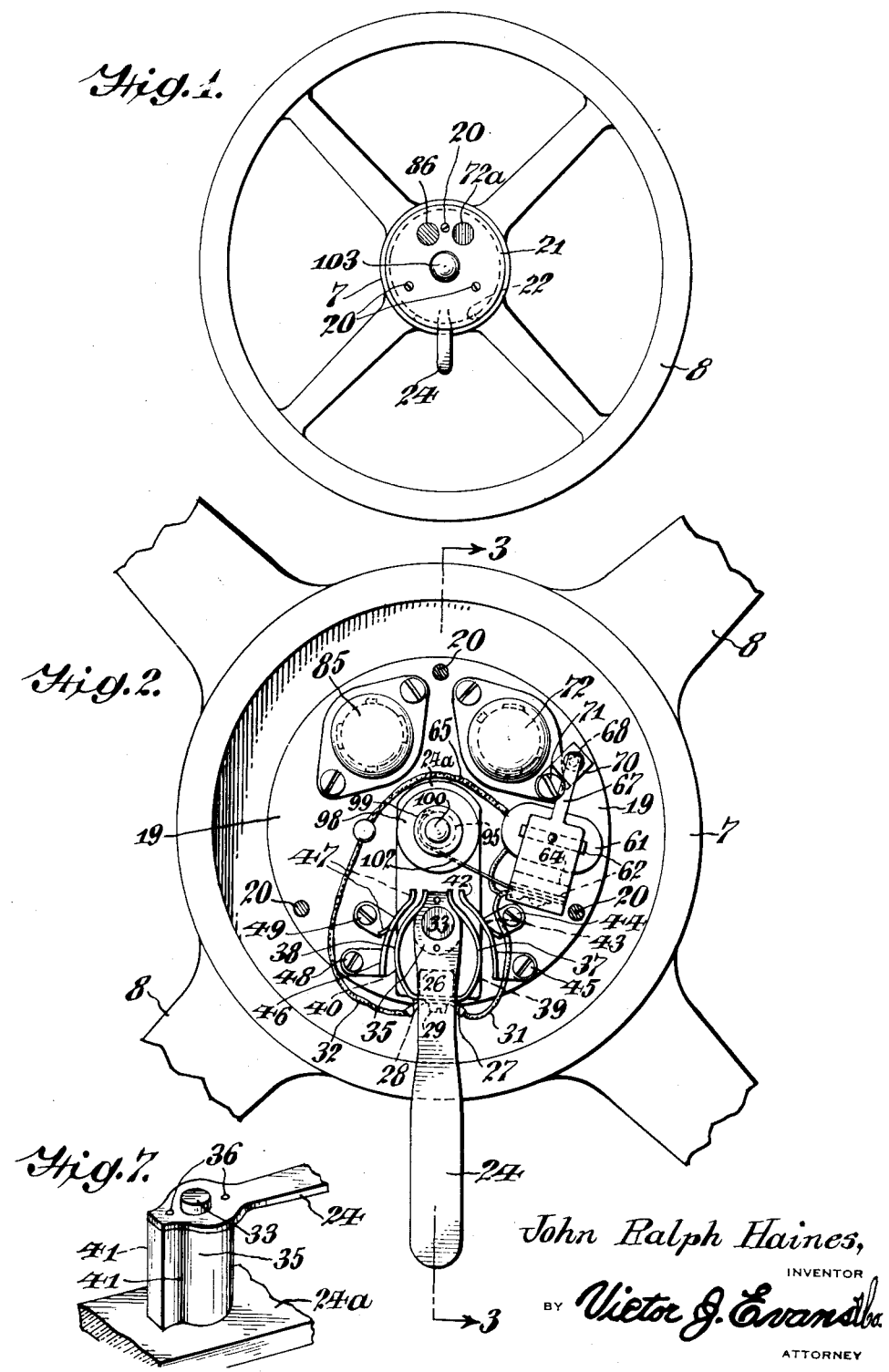

April 2, 1935.  J. R. HAINES  1,996,416
SWITCH MECHANISM FOR FORWARD AND REAR MOTOR VEHICLE SIGNALS
Filed Jan. 8, 1932  3 Sheets-Sheet 2
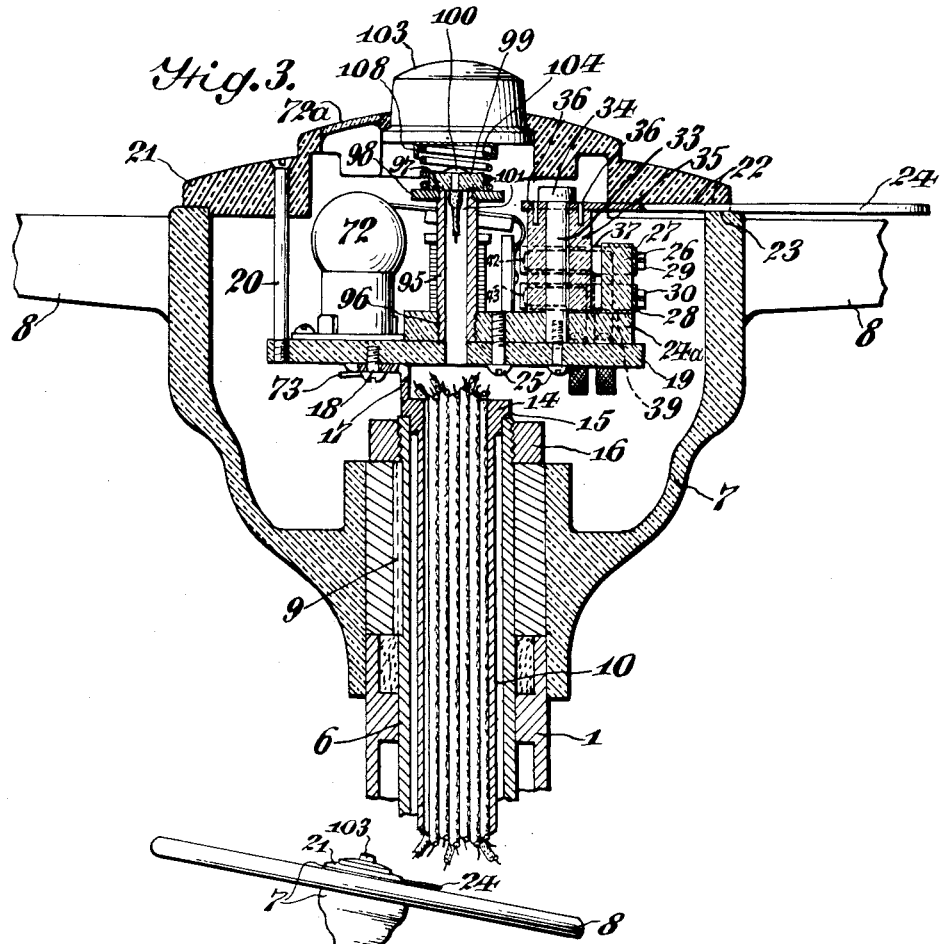
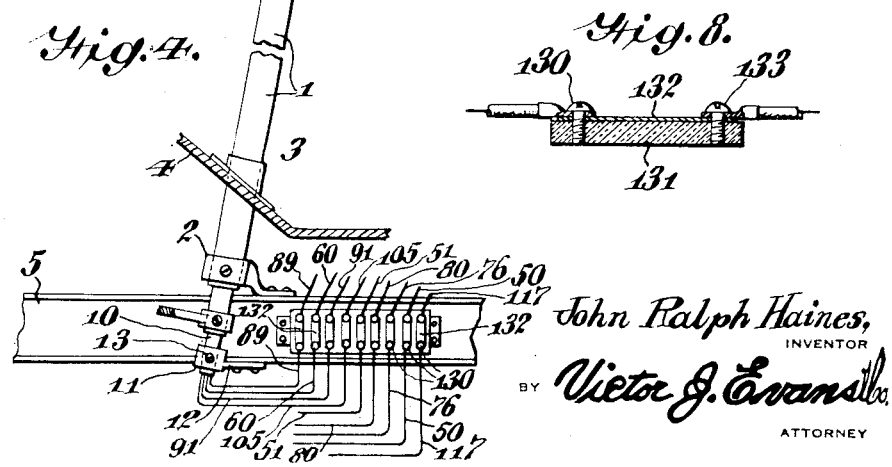
John Ralph Haines,
INVENTOR
BY Victor J. Evans & Co.
ATTORNEY

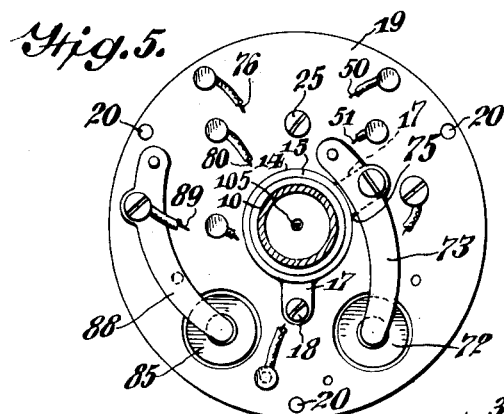
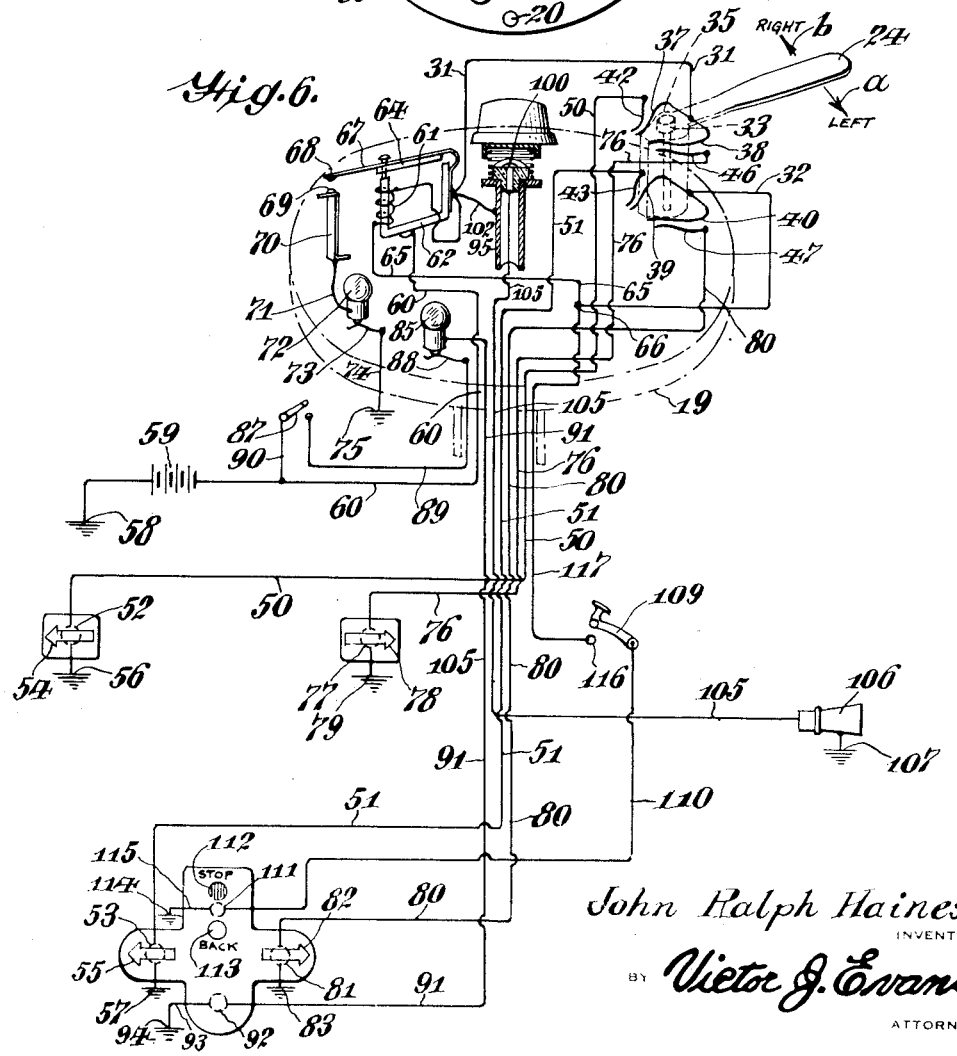

Patented Apr. 2, 1935

1,996,416

UNITED STATES PATENT OFFICE 1,996,416

SWITCH MECHANISM FOR FORWARD AND REAR MOTOR VEHICLE SIGNALS

John Ralph Haines, Vincentown, N. J.

Application January 8, 1932, Serial No. 585,589

1 Claim. (Cl. 200—52)

This invention relates to an improved switch mechanism with wiring system adapted for use in connection with forward and rear motor vehicle signals, and associated with a device for proving whether or not the signals are lighted.

The switch mechanism with the proving device and the system is, in general similar to that disclosed in the co-pending application filed July 17, 1931, Serial Number 551,521, with the exception that instead of the switch mechanism being carried by the rim of the steering wheel, it is held in the hub of the steering wheel, the proving device being likewise held in the hub of the steering wheel, enabling the driver to gaze toward the hub and observe whether the signal lights are illuminated.

Another purpose is to provide an improved spring switch mounted upon a support within the hub of the steering wheel, the switch including a movable switch element having a handle lever for moving the movable switch element in contact with yieldable or spring switch members for the purpose of closing the various circuits throughout the system for illuminating the various signal lights, for indicating right or left turns, stop and backing.

Many drivers of motor vehicles keep their hands very close to the hub of the steering wheel. Some place their hands over the hub engaging certain of their fingers with the spokes of the steering wheel, and others place their hands on the spokes relatively close to the hub, thereby making it convenient for operating the horn button. Therefore it is the purpose to mount this improved switch mechanism in the hub of the steering wheel, thereby making it very convenient for the driver, to not only enable the switch handle to be actuated without any inconvenience, but also enable the horn button to be easily depressed, and at the same time maintain the steering wheel fully under control.

Another reason for mounting the switch mechanism in the hub of the steering wheel is to house the switch mechanism, not only eliminating its use on the rim of the steering wheel (where it is more or less in the way therefore accidentally capable of being operated), but also avoiding its use on the steering column, where it is also in the way, and very awkward and inconvenient to reach in order to operate it, necessitating the removal of the hands from the steering wheel to operate same.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a plan view of a steering wheel of a motor vehicle showing the improved switch mechanism for signal lights as applied to the hub of the wheel.

Figure 2 is an enlarged plan view of the hub of the steering wheel showing the cover plate of the hub removed, illustrating the main elements of the switch mechanism.

Figure 3 is a sectional view on line 3—3 of Figure 2, illustrating the support for the switch mechanism the horn button and also disclosing how the wiring for the various parts of the switch mechanism are held in the steering column.

Figure 4 is a view in elevation of a steering wheel, its steering column, and showing a portion of the motor vehicle chassis, with an insulating plate secured thereto carrying a plurality of bus bars for making electrical connections between wires to the switch mechanism and the various wires leading to the various signal lights.

Figure 5 is an inverted plan view of the support for the switch mechanism, showing the various binding posts for certain of the leads or wires, as well as conductors for the proving lamps.

Figure 6 is a view illustrating diagrammatically the electrical wiring between the switch mechanism and the various signal lights.

Figure 7 is a detail view in perspective of the movable rockable switch element.

Figure 8 is a sectional view transversely through the insulating plate carried by the vehicle chassis showing one of the bus bars in section, with leads or wires connected thereto.

Referring to the drawings 1 identifies a steering column, which is in the form of a tubular casing and held stationary by the bracket 2 and a sleeve 3, which are mounted on the chassis 5 of the motor vehicle and the flooring 4 of the vehicle. This tubular column 1 houses the conventional rotating steering column 6, to the upper end of which the hub 7 of the steering wheel 8 is fastened by means of a key 9. The hub 7 of the steering wheel is in the form of a hollow casing, which houses the switch mechanism for actuating the various signal lights.

Telescopically fitting through the rotating steering column 6 is a tube 10, which is held stationary by means of a sleeve 11 carried by a bracket 12, likewise secured to the chassis of the motor vehicle. Where the tube 10 engages through the sleeve 11 a pin 13 passes, thereby holding the tube 10 against rotation. A collar 14 is preferably integral with the upper end of the tube 10, so that a shoulder 15 of the collar 14 may engage the upper edge of the movable steering column 6 proper. Also a nut 16 is threaded on the upper end of the rotating steering column 6 proper.

The tube 10 houses the various conductor wires or leads, which are connected between the switch mechanism and the bus bars mounted upon an insulating plate, which in turn is secured to the chassis of the motor vehicle.

The collar 14 is provided with a plurality of bracket arms 17, which are secured by screws 18 to a disc 19 constructed of insulating material.

By means of elongated screws 20 the disc 19 is secured stationary with the cover plate 21 for the casing or hub 17 of the steering wheel. This cover or cap plate has its under face provided with a segmental recess 22, which, when the cover or plate is arranged in position, cooperates with the upper margin 23 of the hub casing of the steering wheel and causes a slot to be formed, in which a switch handle lever 24 is operative. The cover or cap plate 21 as well as the disc 19 is stationary with the tube 10, while the steering wheel and its casing hub are movable revolubly with relation to the cover or cap plate and the disc 19.

The disc 19 carries an additional insulating block 24a, which is secured to the disc by screws 25. This insulating block has an upwardly projecting extension 26 to which the spring switch blades 27 and 28 are secured by the screws 29 and 30. These screws 29 and 30 constitute binding posts for the lead wires 31 and 32 shown in diagrammatic view of Figure 6. One of the screws 25 threads into a fulcruming post 33 shown in dotted lines in the diagrammatic view of Figure 6 and in elevation in Figure 3. The upper end of the post 33 has a head 34, below which the handle lever 24 is pivoted. Movable with the handle lever at its end which is pivoted on the post or stud is a switch actuator 35, which is also constructed of insulating material. This actuator is made movable with the handle lever 24 by means of the pins 36. The switch blades 27 and 28 are of arcuate shape, and their spring arms 37 and 38, and 39 and 40 straddle the actuator, as shown in Figure 2 as well as the diagrammatic view of Figure 6 and also in Figure 3. The extremities of these arms are so outwardly curved as to engage with the opposite curved surfaces 41 of the actuator. It is obvious that when moving the handle lever 24 to the left the spring arms 37 and 39 will be moved in contact with the terminal spring arms 42 and 43, which are also secured by screws 44 and 45 to the disc 19. When moving the handle lever to the right the actuator will move the spring arms 38 and 40 in engagement with the spring terminal contact arms 46 and 47, which are fastened by screws 48 and 49 to the disc 19. When the spring arms 37 and 39 are engaged with the terminal spring contact arms 42 and 43, by moving the hand lever 24 to the left as indicated by the arrow a in Figure 6, the circuit is closed over the wires or leads 50 and 51 to the bulbs 52 and 53 of the forward left hand and the rear left hand signal arrows 54 and 55, the circuit being grounded on the machine at 56 and 57. Due to the current being grounded, it passes from the frame of the machine at a point identified at 58 through the battery 59, over the wire or lead 60 to the base and support of the electromagnet 61, the current passing on through the base and support 62 over the lead 31 completing the circuit through the spring arm 37 and contact arm 42. The current in passing to the base and support of the electromagnet 61 energizes the electromagnet and attracts an armature 64, the current passing on through a lead or wire 65 to the junction 66 and to the lead 32 completing the circuit through the spring arm 39 and the terminal spring arm 43. A spring arm 67 is carried by the armature 64 and has a contact 68, which engages with a contact 69 of a post 70, the current passing over a wire or lead 71 to a proving light bulb 72 (a transparency 72a covering the same being colored red) which will show that the bulbs 52 and 53 are lighted. The current passes from the bulb 72 over the contact blade 73, over the wire 74, which is grounded to the frame of the machine at 75 to complete the circuit.

When the handle lever 24 is moved to the right as indicated by the arrow b in Figure 6 engaging the spring arms 38 and 40 with the spring terminal contact arms 46 and 47, completing a circuit over the wire or lead 76 to a bulb 77 of a right hand signal arrow 78, the bulb 77 being grounded at 79. Current also passes along the wire or lead 80 to a bulb 81 of the rear right hand signal arrow 82, the bulb 81 being grounded at 83. The bulb 77 is a bulb for illuminating the forward right hand signal arrow 78. As the bulbs 77 and 81 are grounded at 79 and 83, current passes through the frame of the machine and leaves it at 58 through the battery 59 and the wire 60 to the base or support 62 of the electromagnet 61. The current passes from the support or base of the electromagnet over the wire 31, thereby completing the circuit for illuminating the bulbs 77 and 81. The electric magnet is energized and current passes along the wire or lead 65 to the junction 66 and thence over the wire 32. Current also leaves the electromagnet along the spring arm 67, contacts 68 and 69, over the post 70, the wire or lead 71 to the bulb 72, the spring arm 73 and over the wire 74 back to the battery through the medium of the frame of the vehicle, the bulb 72 indicating whether or not the right hand forward and rear right hand signal arrows are lighted.

A proving bulb 85 (a transparency 86 covering the same being colored green) is provided. This proving bulb 85 is designed to indicate whether or not the tail light is lighted, that is to say, when the switch 87 is closed. For example the bulb 85 is in circuit with the spring conductor arm 88, which is carried on the bottom of the disc 19, and this arm has connected to it a wire or lead 89, which is connected to one of the poles of the switch 87. The other pole of the switch 87 is connected by a wire or lead 90 to the wire or lead 60. A wire or lead 91 connects with the bulb 85 and is in turn connected to the tail light bulb as indicated at 92, which in turn is grounded at 94 by means of the wire or lead 93. Obviously when the switch 87 is closed current from the battery 59 passes over the wire 90 and the switch 87 and the lead or wire 89, through the proving bulb 85, and then over the wire 91 to the tail light bulb, and it being in turn grounded the circuit is completed through the ground connection 58 back to the battery, the bulb 85 proving the fact that the tail light is lighted.

A tube 95 is threaded at 96 into the insulating block 24a, and its upper end has fixed to it at 97 in any suitable manner a disc 98, and carried by this disc in any well known way is an additional disc 99 of insulation, provided with a contact 100. This insulation disc has an extension 101, which is threaded interiorly of the tube 95. Also the tube 95, as shown in Figure 6 is connected by a wire or lead 102 to the support or base of the electromagnet. Obviously since the contact pin 100 is insulated from the tube 95, and due to the signal horn button 103 being tensioned by the spring 104, which spring is in turn engaged upon the discs 98, it is obvious that the circuit is normally open. For instance the circuit along the wire or lead 105 to the horn 106, which is in turn grounded at 107, more clearly shown in Figure 6.

However when the push button 103 is depressed, thereby engaging the bottom of the metal seat 108 (in which the spring 104 is seated) in contact with the contact pin 100 a circuit is closed from the battery through the electromagnet, the tube 95, the disc 98, through the metal seat 108, the contact pin 100, along the wire 105, through the horn and through the ground connections of the frame of the machine and back to the battery.

A foot brake lever 109 is in circuit through the wire or lead 110 with the bulb 111 which illuminates through the transparency at 112 and 113, the bulb 111 being in turn grounded to the frame of the machine at 114 by the wire or lead 115. The other pole 116 of the foot brake pedal switch is connected by a wire or lead 117 to the junction 66. Obviously when the foot brake pedal switch 109 is actuated the circuit from the battery through the electromagnet through the medium of the requisite wire or leads connected thereto, is closed, namely the wire 60, and then over the wire 65, through the junction 66, the wire 117, then the lead or wire 110, through the bulb 111, back to the frame of the machine and from the ground connection 58 back to the battery, thereby illuminating the bulb 111. The transparencies 72a and 86 are carried in openings formed in the cover plate 21.

The wires 50, 51, 60, 76, 80, 89, 91, 105 and 117 pass through the tube 10 mounted in the steering column 1, and are in turn connected to binding screws 130 carried by an insulating plate 131 provided with a plurality of conductor strips 132, which are secured to the insulating plate 131 by the binding screws 130 and 133, to the latter of which corresponding wires likewise identified are connected, and are in turn connected to their respective operating elements as previously set forth.

The invention having been set forth, what is claimed is:

A control switch serviceable for use with a steering column and a steering wheel and a housing centrally of and movable with the wheel, said control switch comprising a stationary switch base operatively supported within said housing, a cover for the housing and made stationary with said base, said control switch including a stud rising from the base, a switch actuator rockable on the stud, an upstanding extension on the base, upper and lower substantially elliptical yieldable contacts straddling and secured to said extension and having their free ends engaged with the actuator, upper and lower additional yieldable contacts operatively supported on the base, said last named contacts substantially conforming to and aligned with the first contacts, said last named contacts normally spaced from the first contacts, said actuator and the first contacts constructed and arranged, whereby as the actuator is rocked in one direction or the other certain of the first contacts are brought into engagement with certain of the second contacts, and a lever fixed to the upper end of the actuator and engaging between the cover and the margin of the housing and extending therebeyond for rocking the actuator.

JOHN RALPH HAINES.